Oct. 12, 1926.
G. FORNACA
MOTOR VEHICLE
Filed March 14, 1923
1,602,971
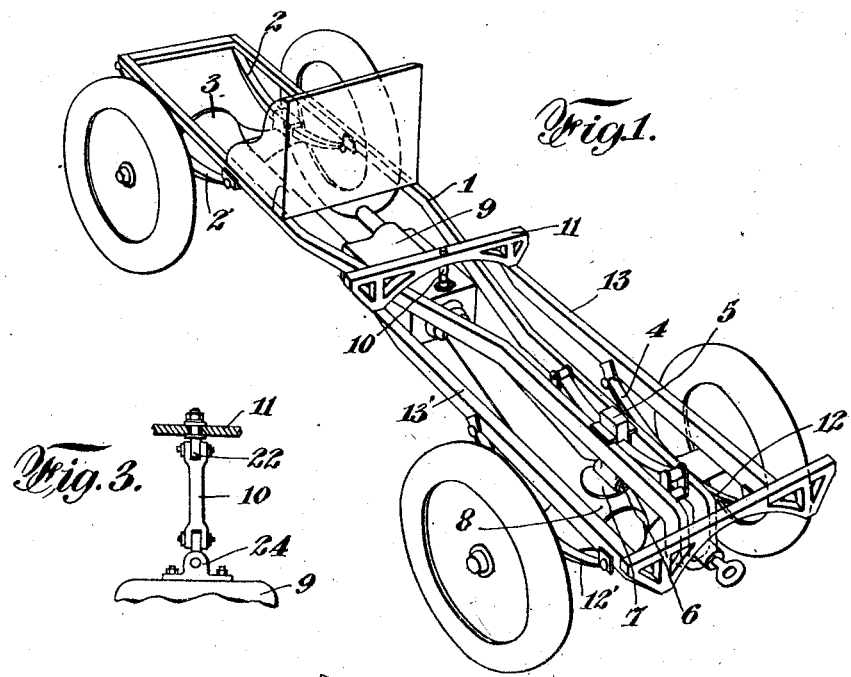
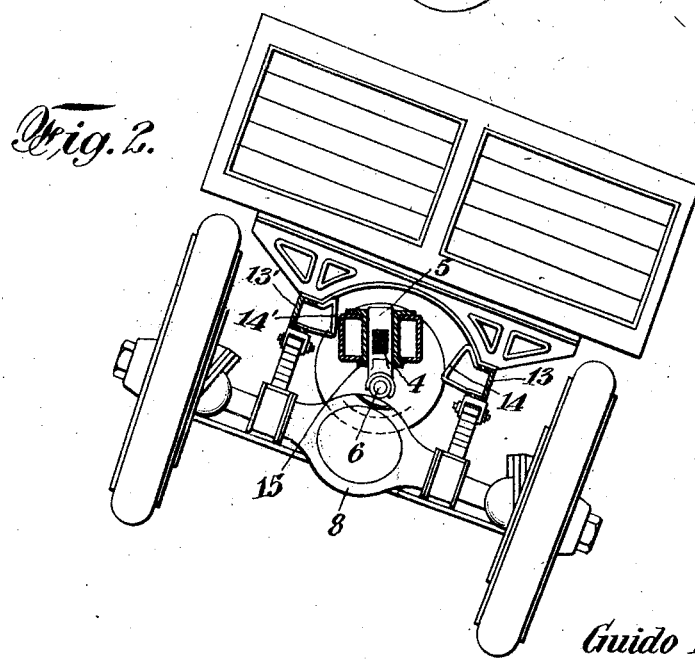
Inventor
*Guido Fornaca*
By his Attorneys
*Edwards, Sager and Bower*

Patented Oct. 12, 1926.

1,602,971

UNITED STATES PATENT OFFICE.

GUIDO FORNACA, OF TURIN, ITALY.

MOTOR VEHICLE.

Application filed March 14, 1923, Serial No. 624,907, and in Italy March 20, 1922.

This invention relates to motor vehicles and particularly to a motor vehicle having improved running gear.

One object of my invention is to provide a vehicle having four driven steering wheels and having a chassis carrying the engine, transmission units and driver's seat, which chassis is supported at three points, one of which points is articulated and a chassis carrying the car body likewise supported at three points, one of which is articulated.

The forward portion of the chassis proper or the one carrying the engine, gear units and driver's seat, is supported from the front axle casing by semi-elliptical springs. This chassis is tapered and prolonged toward the rear and is supported by a spring which is pivotally connected to the middle portion of the rear axle casing.

The auxiliary chassis or that one carrying the car body, comprises a substantially rectangular frame which is supported at its sides from the rear axle by semi-elliptical springs and is connected to the chassis proper by an articulated joint.

Transmission takes place from the engine through the various transmission units such as the change-speed gear, clutch, transmission brake, etc., to both front and rear axles, and such axles are connected with the wheels by means of Cardan joints which allow all four driven wheels to be moved to steer the vehicle by the customary steering means.

By reason of arrangement described a firm and uniform adherence of the four wheels to the road is obtained and the shocks due to unevenness of the road are largely absorbed, because of the resilient support of the running gear and its sub-division into two chassis which are free to oscillate relative to one another in a transverse direction.

Numerous objects and advantages of my invention will appear from the following description taken in connection with the accompanying drawing, wherein Fig. 1 is a perspective view of the vehicle embodying one form of my invention the car body, engine and other parts being removed so as to show the vehicle running gear.

Fig. 2 is a rear elevation, partly in section, of the vehicle shown in Fig. 1, and disclosing the rear axle and auxiliary chassis inclined relative to the chassis proper.

Fig. 3 is a detail of a modified form of the articulated rod connecting the auxiliary chassis to the chassis proper.

Referring to Fig. 1, 1 denotes the chassis proper which is supported from the front axle casing 3 by means of semi-elliptical springs 2, 2'. The chassis 1 is tapered toward the rear and is supported from the rear axle casing 8 by means of a spring 4 which is carried by a member 5 pivoted at 6 to the swivel plate 7, mounted on the top of the center portion of the rear axle 8. The spring 4 is centered between the side members of the chassis by plates 15, 15' which serve as guides for the member 5.

30 represents an engine and 9 a casing of a transmission unit, both of which are mounted upon the chassis 1. The front and rear axle casings are connected to the casing 9 by suitable joints and power is transmitted to the front and rear axles by means of Cardan shafts extending through these joints. 31 represents a driver's seat mounted on the chassis 1.

Resting in a spherical seat formed in the upper portion of the casing 9 is one end of a connecting rod 10. The other end of the connecting rod 10 rests in a similar seat formed in the cross member 11 of the auxiliary chassis 13, which carries the car body.

The auxiliary chassis is supported from the rear axle casing 8 by semi-elliptical springs 12, 12' the ends of which are connected to the side bars 13, 13' of the auxiliary chassis.

It will thus be seen that each of the chassis are supported at three points in such a manner as to enable them to tilt relatively to one another without subjecting the parts to injurious strains.

In Fig. 2 the rear axle casing 8 and auxiliary chassis are shown tilted to the maximum extent relative to the front axle 3 and chassis proper. Further tilting is prevented by means of stops 14, 14' secured to the side bars 13, 13' of the auxiliary chassis.

Fig. 3 shows a modified form of the connection between the auxiliary chassis and the casing 9. In this case the connecting rod 10' instead of having ball shaped ends is joined at its upper end at 22 to the cross member 11 so as to permit oscillation backward and forward and at its lower end by means of the fastening 24 to the casing 9, so as to permit oscillation backward and forward and also at right angles thereto. The rod 10' is therefore able to incline itself in accordance with the displacements of the two chassis relative to one another.

Claims:

1. A motor vehicle comprising front and rear axles, a chassis, means for resiliently supporting said chassis at its sides from one of said axles, means for resiliently and pivotally supporting said chassis centrally of its width from the other of said axles, an engine and transmission units mounted on said chassis, a second chassis, means for resiliently supporting said second chassis at its sides from the said other axle, means for pivotally supporting said second chassis centrally of its width from said first-named chassis, and a car body carried by said second chassis.

2. A motor vehicle comprising front and rear axles, a chassis, means for resiliently supporting said chassis from two points on one axle, means for resiliently and pivotally supporting said chassis from a single point on the other axle, a second chassis, means for resiliently supporting said second chassis from two points on said other axle, and means for pivotally supporting said second chassis from said first-named chassis at a point substantially midway between said axles.

3. A motor vehicle comprising front and rear axles, a chassis comprising a frame formed of side bars spaced at one end and tapering toward the other end, semi-elliptical springs supporting said side bars from one axle, a semi-elliptical spring pivotally mounted from a single point centrally of the other axle so as to permit rotation thereof in a transverse plane, said last named spring serving to support said bars above said other axle.

4. An improved motor vehicle as set forth in claim 1 wherein the first named chassis is prolonged and tapered at its rear to a point beyond the rear axle and rests on a semi-elliptical spring secured to a hinge on said rear axle, said hinge having longitudinal axis of rotation, the said chassis being thereby resiliently supported at three points.

5. A motor vehicle comprising front and rear axles, a main chassis, means for resiliently supporting said chassis on both of said axles, a second chassis, means for resiliently supporting said second chassis on only one of said axles, and means for pivotally supporting said second chassis from said main chassis at a point intermediate said axles.

6. A motor vehicle comprising front and rear axles, a main chassis, means for resiliently supporting said chassis on one of said axles, means for resiliently and pivotally supporting said chassis from a single point on the other of said axles, a second chassis, means for resiliently supporting said second chassis from two points on said other axle, and means for pivotally supporting said second chassis from said main chassis at a point substantially midway between said axles.

7. A motor vehicle comprising front and rear axles, a driving gear chassis, means for resiliently supporting said chassis on one of said axles, means for pivotally supporting said chassis from a single point on the other of said axles, a body chassis, means for resiliently supporting said body chassis from two points on said other axle, and means for pivotally supporting said body chassis from said running gear chassis at a point substantially midway between said axles.

ING. GUIDO FORNACA.